(12) United States Patent
Rodoni (10) Patent No.: US 10,296,855 B2
(45) Date of Patent: May 21, 2019

(54) SYSTEM AND METHOD FOR MANAGING WASTE SERVICES

(71) Applicant: Rubicon Global Holdings, LLC, Altanta, GA (US)

(72) Inventor: Philip Rodoni, Decatur, GA (US)

(73) Assignee: Rubicon Global Holdings, LLC, Atlanta, GA (US)

( * ) Notice: Subject to any disclaimer, the term of this patent is extended or adjusted under 35 U.S.C. 154(b) by 46 days.

(21) Appl. No.: 15/206,492

(22) Filed: Jul. 11, 2016

(65) Prior Publication Data
US 2018/0012172 A1    Jan. 11, 2018

(51) Int. Cl.
| | |
|---|---|
| *G06Q 10/06* | (2012.01) |
| *H04W 4/04* | (2009.01) |
| *H04W 4/021* | (2018.01) |
| *G06Q 20/10* | (2012.01) |
| *G06Q 50/26* | (2012.01) |
| *H04W 84/12* | (2009.01) |

(52) U.S. Cl.
CPC ..... *G06Q 10/063114* (2013.01); *G06Q 10/06* (2013.01); *G06Q 20/102* (2013.01); *G06Q 50/26* (2013.01); *H04W 4/021* (2013.01); *H04W 4/04* (2013.01); *H04W 84/12* (2013.01)

(58) Field of Classification Search
CPC ........... G06Q 10/0833; G06Q 30/0261; G06Q 10/063114; G06Q 10/30; G08G 1/205; G08G 1/096827; G08G 1/123
USPC ........................................................ 705/7.11
See application file for complete search history.

(56) References Cited

U.S. PATENT DOCUMENTS

| | | | | |
|---|---|---|---|---|
| 5,014,206 | A * | 5/1991 | Scribner ................ | G07C 5/008 340/3.31 |
| 2002/0082809 | A1* | 6/2002 | Kanevsky .............. | G06Q 10/06 702/188 |
| 2002/0119791 | A1* | 8/2002 | Bai .......................... | G01S 1/68 455/456.6 |
| 2004/0243430 | A1* | 12/2004 | Horstemeyer ........ | B60R 25/102 340/928 |
| 2006/0095348 | A1* | 5/2006 | Jones ........................ | G01S 5/02 705/29 |
| 2009/0216663 | A1* | 8/2009 | White .................... | G06Q 10/08 705/28 |
| 2010/0071572 | A1* | 3/2010 | Carroll .................. | B30B 9/3007 100/229 A |
| 2010/0088203 | A1* | 4/2010 | Hynes ................... | B65F 1/1484 705/30 |

(Continued)

Primary Examiner — Renae Feacher
(74) Attorney, Agent, or Firm — Rock IP, PLLC (57) ABSTRACT

A system is disclosed for managing waste services. The system may have a locating device configured to generate a signal indicative of a location of a service vehicle, a motion tracking device wearable by an management personnel of the service vehicle, and a controller in communication with the locating and motion tracking devices. The controller may be configured to determine based on the signal a proximity of the service vehicle to a target location at which the waste services are to be performed, and to monitor an activity of the management personnel via the motion tracking device when the proximity of the service vehicle is within a threshold proximity of the target location. The controller may also be configured to automatically flag the target location in memory as having been serviced based on the monitored activity of the management personnel.

18 Claims, 4 Drawing Sheets

(56) References Cited

U.S. PATENT DOCUMENTS

| | | | | |
|---|---|---|---|---|
| 2013/0289819 A1* | 10/2013 | Hassib | .................... | G06F 17/00 |
| | | | | 701/29.6 |
| 2013/0324152 A1* | 12/2013 | Lee | .................... | H04W 64/006 |
| | | | | 455/456.1 |
| 2014/0179338 A1* | 6/2014 | Shang | .................. | H04W 4/023 |
| | | | | 455/456.1 |
| 2014/0195074 A1* | 7/2014 | Hunt | .................... | B60W 50/08 |
| | | | | 701/2 |
| 2014/0278638 A1* | 9/2014 | Kreuzkamp | ..... | G06Q 10/06398 |
| | | | | 705/7.15 |
| 2015/0019135 A1* | 1/2015 | Kacyvenski | ......... | A61B 5/0488 |
| | | | | 702/19 |
| 2015/0081162 A1* | 3/2015 | Mitchell | ............... | B60W 40/09 |
| | | | | 701/32.4 |
| 2015/0348252 A1* | 12/2015 | Mask | ................ | G06K 9/00201 |
| | | | | 382/103 |
| 2016/0086391 A1* | 3/2016 | Ricci | ...................... | G07C 5/008 |
| | | | | 701/29.3 |
| 2016/0125348 A1* | 5/2016 | Dyer | ............... | G06Q 10/06398 |
| | | | | 705/7.42 |
| 2017/0109704 A1* | 4/2017 | Lettieri | ............. | G06Q 10/1093 |

\* cited by examiner

SYSTEM AND METHOD FOR MANAGING WASTE SERVICES

TECHNICAL FIELD

The present disclosure relates generally to a management system and method, and more particularly, to a system and method for managing waste services.

BACKGROUND

Residential waste service providers typically dispatch service vehicles to customer properties according to a predetermined pickup route assigned to each service vehicle. The pickup route for each service vehicle is often designed to provide waste services (e.g., to empty waste receptacles) within a particular geographical area (e.g., a subdivision) and at a particular frequency (e.g., once per week). For example, a particular service vehicle may be tasked to service several hundred waste receptacles at closely-spaced residences within a particular subdivision on a Tuesday of every week. After completion of the waste services within that subdivision, the service vehicle operator may report the completion to a back office, which updates the operator's route and an account record for each customer. Customers in the subdivision that subscribe to these waste services are then billed based on the account record.

In some instances, service of a particular receptacle at a particular residence may not be completed. For example, it may be possible for the service vehicle to arrive at a residence where no receptacle was placed out for service. In another example, it may be possible that the receptacle was placed out, but damaged, spilled, filled with restricted materials, or otherwise rendered unserviceable. In yet another example, it may be possible for the service vehicle operator to inadvertently pass by a residence without performing service, even if the receptacle was properly placed out and serviceable. In these situations, a clear record of services being performed or not being performed may be helpful for customer relations.

Historically, confirmation of service being performed at a particular residence was attained manually. In particular, the operator of the service vehicle would manually check off a paper list each time the service was performed, and/or provide reasons for any service that was not performed. While this approach may have been successful in some instances, it was also problematic. In particular, the manual confirmation was tedious and drew the operator's time and attention away from the actual service being performed and/or operation of the service vehicle. In addition, the manual confirmation provided hundreds of opportunities for error during each work shift.

The disclosed system and method are directed to overcoming one or more of the problems set forth above and/or other problems of the prior art.

SUMMARY

In one aspect, the present disclosure is directed to a system for managing waste services. The system may include a locating device configured to generate a signal indicative of a location of a service vehicle, a motion tracking device wearable by an management personnel of the service vehicle, and a controller in communication with the locating and motion tracking devices. The controller may be configured to determine based on the signal a proximity of the service vehicle to a target location at which the waste services are to be performed, and to monitor an activity of the management personnel via the motion tracking device when the proximity of the service vehicle is within a threshold proximity of the target location. The controller may also be configured to automatically flag the target location in memory as having been serviced based on the monitored activity of the management personnel.

In another aspect, the present disclosure is directed to a method for managing waste services. The method may include generating a signal indicative of a location of a service vehicle, and determining based on the signal a proximity of the service vehicle to a target location at which the waste services are to be performed. The method may also include monitoring an activity of a management personnel when the proximity of the service vehicle is within a threshold proximity of the target location, and automatically flagging the target location in memory as having been serviced based on the monitored activity of the management personnel.

In yet another aspect, the present disclosure is directed to a non-transitory computer readable medium containing computer-executable programming instructions for performing a method of waste service management. The method may include generating a signal indicative of a location of a service vehicle, and determining based on the signal a proximity of the service vehicle to a target location at which the waste services are to be performed. The method may also include monitoring an activity of a management personnel when the proximity of the service vehicle is within a threshold proximity of the target location, and automatically flagging the target location in memory as having been serviced based on the monitored activity of the management personnel.

DETAILED DESCRIPTION

Figure 1:
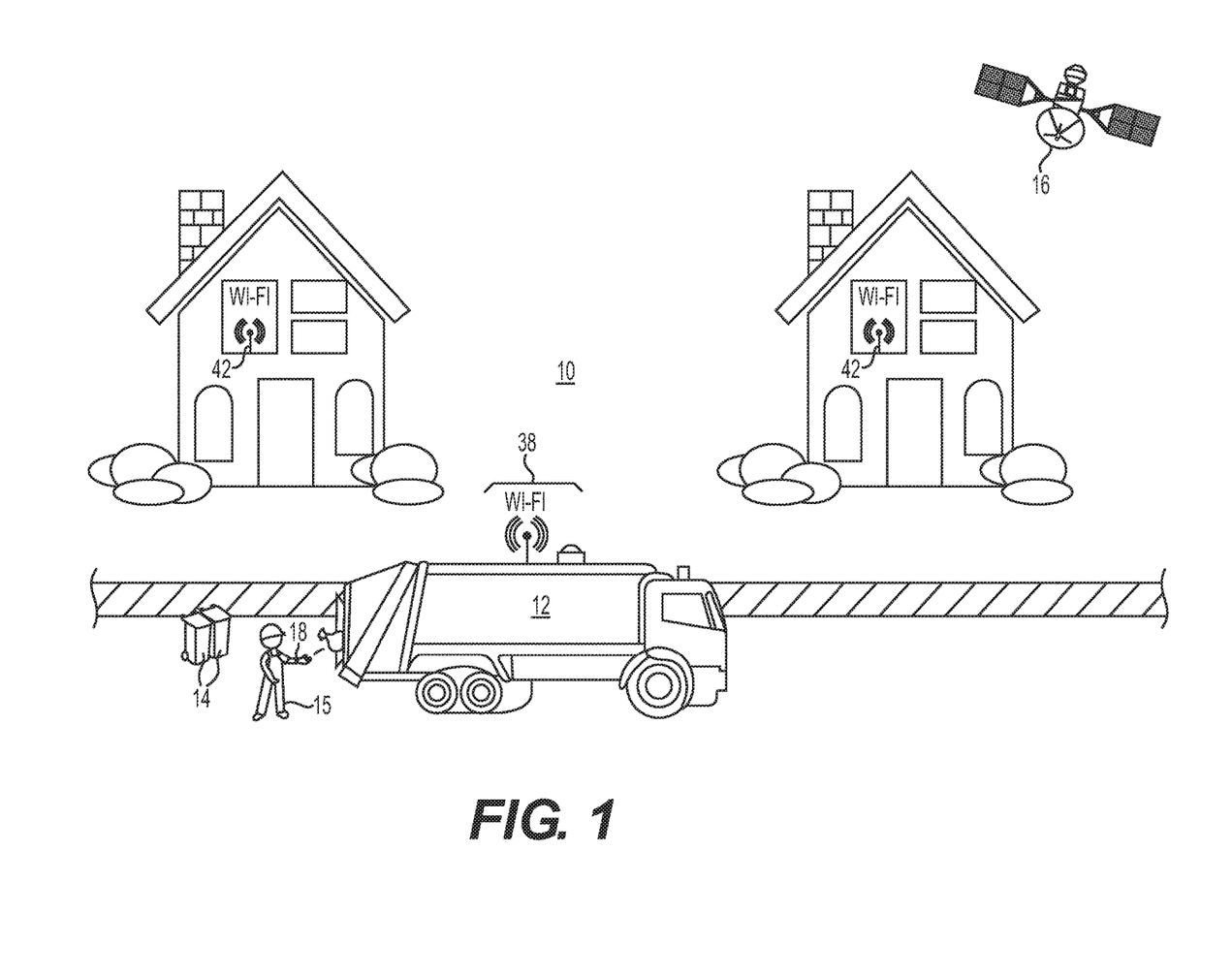
FIG. 1 is a perspective illustration of an exemplary disclosed waste management environment.

FIG. 1 illustrates an exemplary waste management environment ("environment") 10, at which one or more service vehicles 12 are providing waste services. Environment 10 may include any number of retail stores, factories, government buildings, residential addresses, or other locations having one or more receptacles 14 that require the service of vehicle 12. The service may include, for example, the removal of waste materials from inside of receptacle 14, the replacement of receptacle 14, and/or the placement of new or additional receptacles 14.

Vehicle 12 may embody a haul truck (and/or a trailer that is attachable to the haul truck), which includes or otherwise carries a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch. For example, management personnel 15 may be able to manually empty receptacles 14 into the storage compartment of a rear-hatch vehicle 12. In another example, vehicles 12 may include mechanical, electrical, and/or hydraulic systems configured to automatically grasp, lift, tilt, shake, and thereby empty receptacles 14 into vehicle 12 via a top-hatch. In yet another example, some tasks (e.g., grasping) may be completed manually and other tasks (e.g., lifting, tilting, and shaking) may be completed with the assistance of the mechanical, electrical, and/or hydraulic systems via a side-hatch of vehicle 12. In a final example, receptacle 14 may simply be loaded (e.g., manually, automatically, or semi-automatically) together with the waste contents onto vehicle 12 and transported away for emptying at another location.

As each vehicle 12 services receptacles 14 within environment 10, the motions of vehicle 12 and/or management personnel 15 that operate vehicle 12 may be monitored. For example, a satellite 16 or other tracking device may communicate with an onboard controller 30 (shown only in FIG. 2) to monitor the movements of vehicle 12 and the associated changes made to environment 10 (e.g., pickup, transporting, dumping, placing, etc.). Similarly, a wearable 18 or other tracking device may communicate with onboard controller 30 to monitor the movements of management personnel 15 and the associated changes made to environment 10. As will be explained in more detail below, onboard controller 30 may facilitate management of service activities performed within environment 10 based on the tracked movements of vehicle 12 and management personnel 15.

Wearable 18 may be attached to the user, for example, by way of a wristband (shown in FIG. 1), a glove, a lanyard, a headband, a hardhat, a vest, etc. Wearable 18 may include at least one motion sensor (e.g., an accelerometer, a gyroscope, etc.—not shown) and a transmitter (not shown). The motion sensor may be configured to generate a signal corresponding to a motion of management personnel 15 that has been shown to correlate to the completion of a service activity (e.g., lifting, tilting, dumping shaking, etc. of receptacle 14 and/or the waste inside of receptacle 14). It is contemplated that any number and combination of sensors may be used. The transmitter may be configured to wirelessly broadcast the signals from the motion sensor of wearable 18 to onboard controller 30, for example via Low-Power Bluetooth.

Onboard controller 30 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. In some embodiments, onboard controller may be carried by the operator and/or other management personnel 15. For example, onboard controller 30 could be embodied as a smartphone, tablet, or other personal computing device.

Figure 2:
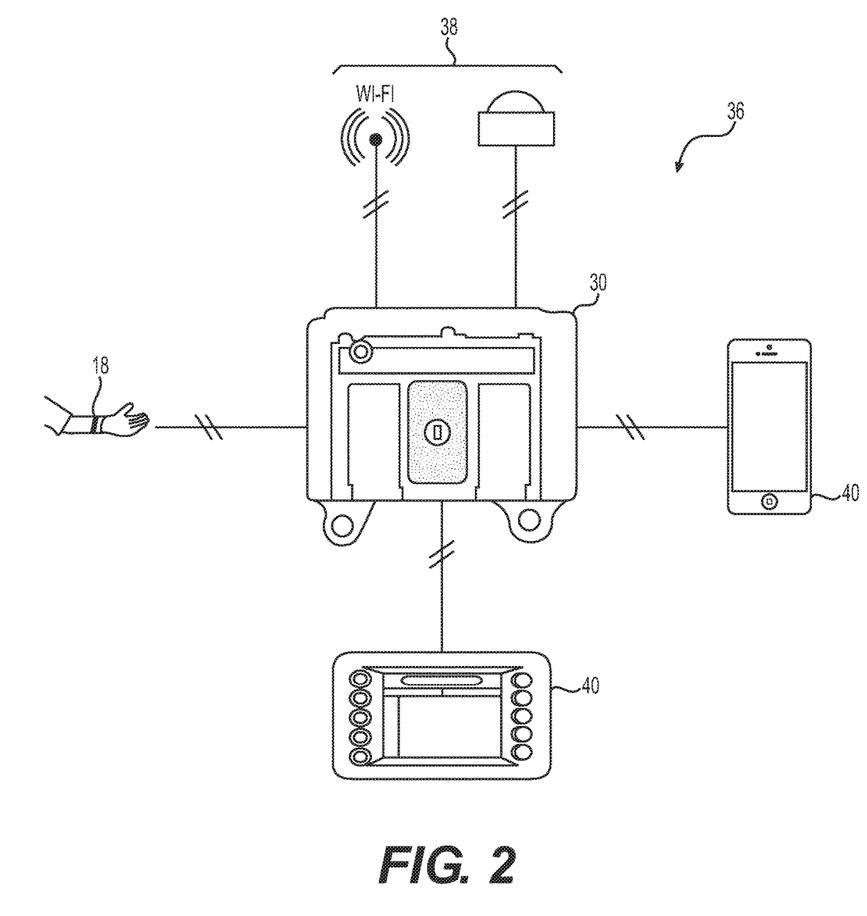
FIG. 2 is a diagrammatic illustration of an exemplary disclosed system that may be used to manage the environment of FIG. 1.

As shown in FIG. 2, onboard controller 30 and wearable 18 may form portions of a waste management system ("system") 36 that is configured to track, assist, and/or control movements of service vehicle(s) 12 (shown only in FIG. 1). In addition to onboard controller 30, system 36 may also include at least one locating device 38 and at least one input device 40 mounted or otherwise located onboard each service vehicle 12. Onboard controller 30 may be in communication with each of these other components and configured to determine, based on signals from these components and based on other known information stored in memory, the location of each service vehicle 12 and characteristics and locations of receptacles 14 being moved by and/or in a vicinity of each service vehicle 12.

In one embodiment, locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver (shown on the right in FIGS. 1 and 2) configured to communicate with satellites 16 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. Based on the signals generated by locating device 38 and based on known kinematics of service vehicle 12, onboard controller 30 may be able to determine in real or near real time, the position, heading, travel speed, acceleration, and orientation of service vehicle 12. This information may then be used by onboard controller 30 to update the locations and conditions of service vehicle(s) 12 and/or receptacles 14 in an electronic map or database of environment 10.

In another embodiment, locating device 38 may be configured to generate signals indicative of a proximity of service vehicle 12 to a target location (e.g., at location at which waste services are to be performed) with environment 10. For example, locating device 38 may embody an electronic receiver (shown on the left in FIGS. 1 and 2) configured to communicate with any number of local transmitters 42 (e.g., Wi-Fi transmitters based at target locations to be serviced by vehicle 12—shown only in FIG. 1, wireless utility meter transmitters, or other types of transmitters). Locating device 38 may receive and analyze signals from transmitter 42 to determine a unique identification of transmitter 42 (e.g., the owner and/or address of transmitter 42). Based on the signals generated by locating device 38 (e.g., a strength of the signals) and based on known kinematics of service vehicle 12, onboard controller 30 may be able to determine in real or near real time a distance of service vehicle 12 from transmitter 42. This information may then be used by onboard controller 30 to update the locations and conditions of service vehicle(s) 12 and/or receptacles 14 in an electronic map or database of environment 10.

It is contemplated that system 36 may include both types of locating devices 38 (e.g., the satellite based and/or the local transmitter devices), if desired. In this example, the satellite based device may provide a general vicinity of service vehicle 12, while the local transmitter device may correlate the current location of service vehicle 12 to a particular customer (i.e., a particular target location) based on proximity.

Input device 40 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about receptacle 14 and the waste engaged by, loaded into, or otherwise processed by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In addition to receiving manual input from an operator, input device 40 may also be capable of displaying information, for example the electronic map of environment 10, instructions, scheduling, routing, receptacle information (e.g., ID, configuration, location, weight, etc.), payload information (e.g., weight and/or volume), etc.

In some embodiments, input device 40 may be configured to execute an application. For example, when input device 40 is a mobile device (for example a smartphone), the application can be a mobile app ("app"). An app is an abbreviated term for a "software application", which is downloadable to and executable by a mobile device (e.g., a laptop, a smart phone, or a tablet). The disclosed waste management app can provide a graphical user interface (GUI) configured to display information about a waste service to the operator (e.g., management personnel 15) of service vehicle 12, to receive input from the operator regarding a completed or incomplete service activity, to transmit the operational data to onboard controller 30, to receive and display information about a current operation, etc.

Onboard controller 30 may be configured to manage communications between other onboard components (and, in some instances, between onboard and offboard components). For example, onboard controller 30 may receive signals from locating device(s) 38 and input device(s) 40, and correlate the signals, filter the signals, buffer the signals, record the signals, or otherwise condition the signals.

Figure 3:
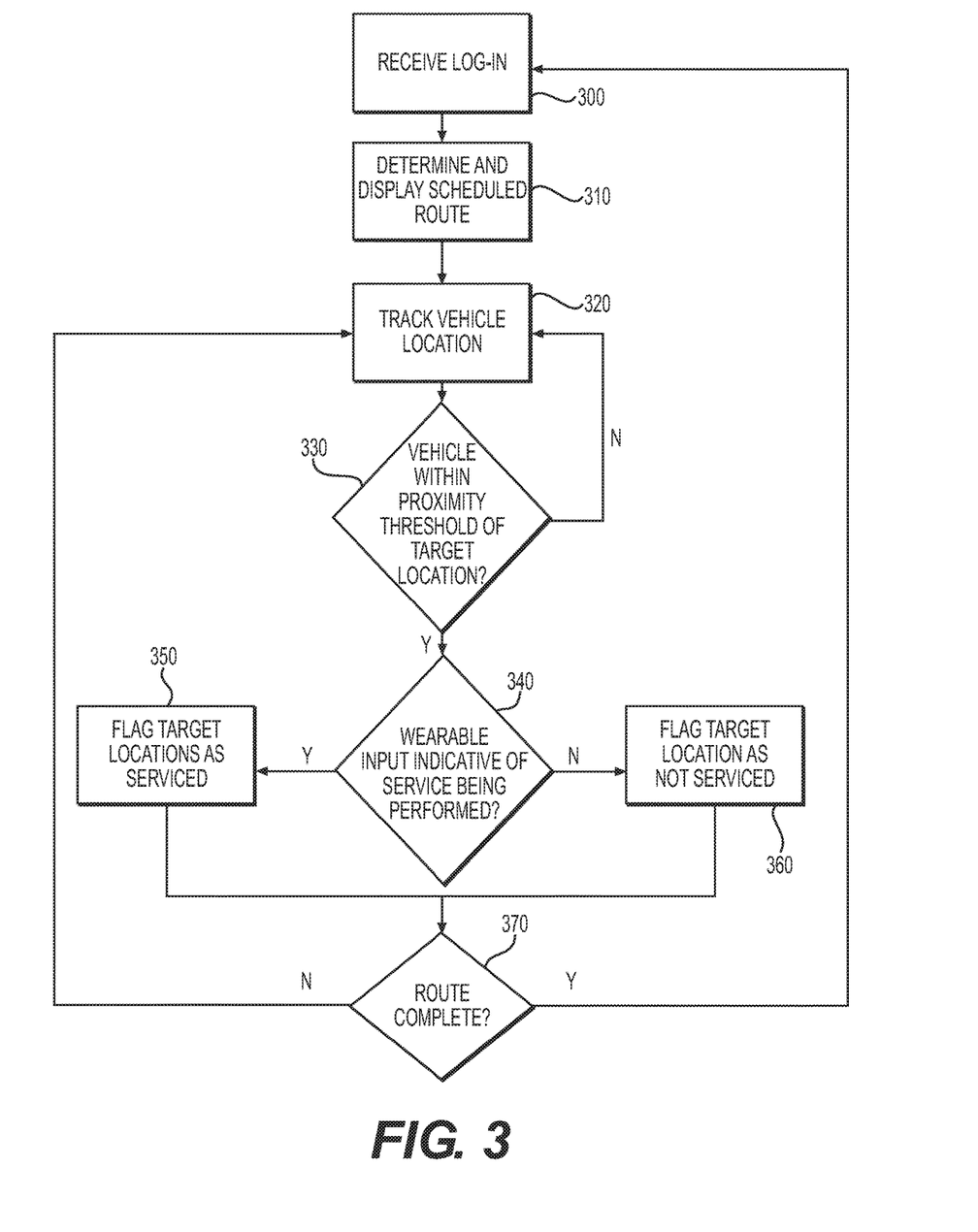
FIG. 3 is a flowchart illustrating an exemplary disclosed method of managing waste services that may be performed by the system of FIG. 2.
Figure 4:
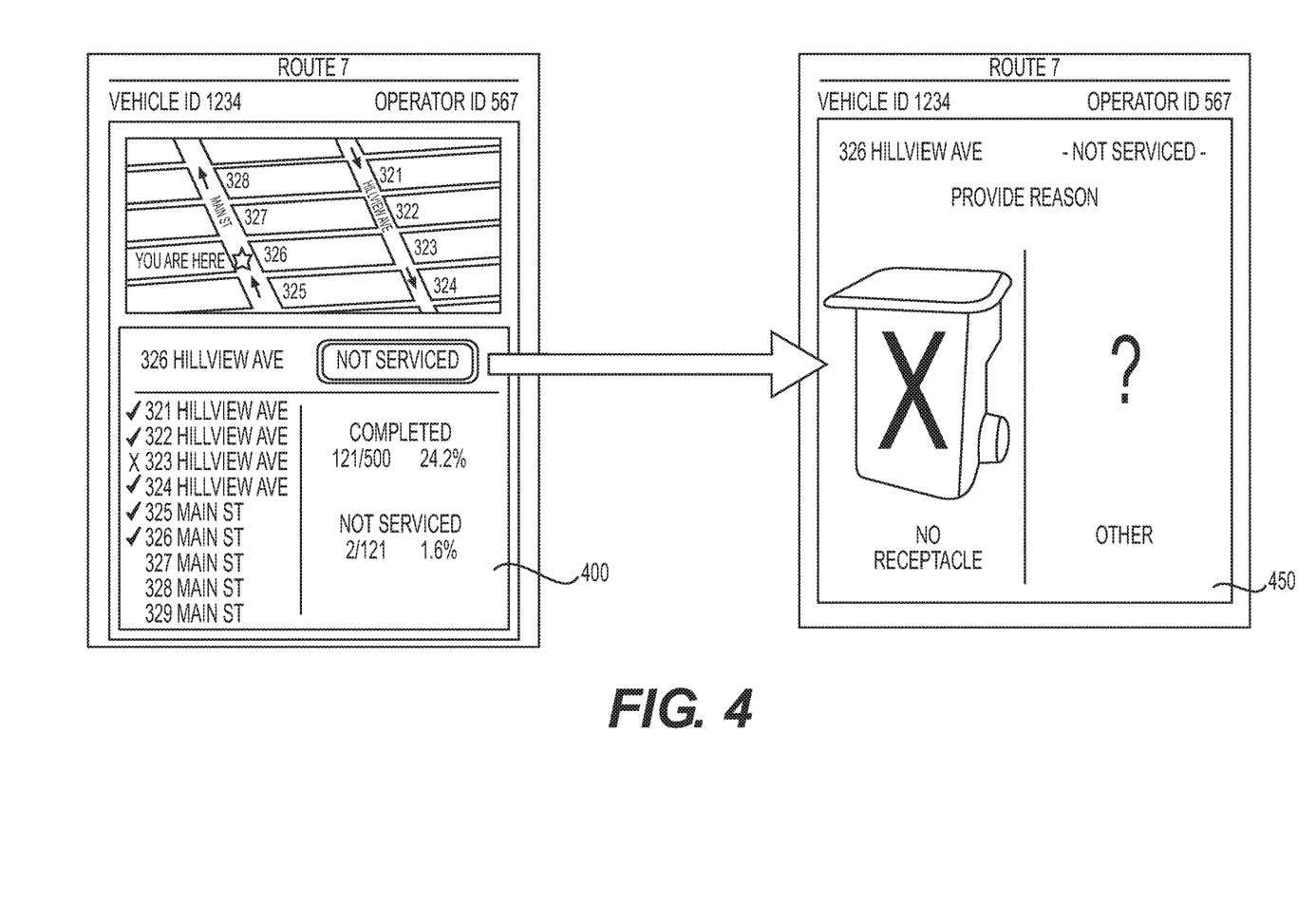
FIG. 4 is a diagrammatic illustration of exemplary disclosed graphical user interfaces that may be used to access the system of FIG. 2.

Onboard controller 30, based on the information received from the other devices located onboard service vehicle 12, can be configured to execute instructions stored on computer readable medium to perform methods of waste service management at environment 10. For example, onboard controller 30 may be configured to determine when service vehicle 12 is close to a target location at which waste services are to be performed, detect management personnel 15 performing the waste services, and create a record of the performance that is stored in the memory of controller 30. An exemplary process of waste service management that may be performed by onboard controller 30 is illustrated in FIG. 3 and will be explained in more detail in the following section to further illustrate the disclosed concepts. In addition, FIG. 4 represent exemplary Graphical User Interfaces (GUIs) that may be shown in connection with the disclosed waste management method on any input device 40 for use in accessing system 36. FIG. 4 will also be discussed in greater detail below to further illustrate the disclosed concepts.

INDUSTRIAL APPLICABILITY

The disclosed system, method, and app may be applicable to the waste service industry, where efficient management of waste services can affect profitability of a service provider. The disclosed system, method, and app may automatically confirm that a particular service at a particular target location has been completed. For example, the disclosed system, method, and app may provide graphical user interfaces (GUIs) allowing the operator to see an assigned route of target locations at which service should be provided. The GUIs of the disclosed app may also allow the operator to view the location of service vehicle 12 relative to the target locations. The GUIs provided by the disclosed app may also relay to the operator visual directions to the target locations locations, provide visual status indicators associated with confirmed service activities, and provide a way for the operator to give feedback or other input regarding the service activities, the target locations, the service vehicle 12, the route, etc. The disclosed method will now be explained in detail with reference to FIG. 3.

As seen in FIG. 3, the method implemented by onboard controller 30 may begin when a vehicle operator (e.g., management personnel 15) logs into the disclosed app (Step 300). During this login, the operator may provide, for example, an identification of the operator and/or of the particular service vehicle 12 that will be driven by the operator for the given work shift. Onboard controller 30 may then determine and display a route of target locations that the operator should service during the work shift (Step 310). In some instances, the route may be determined automatically by onboard controller 30, for example based on the service vehicle identification, the operator identification, the day of the week, or another similar factor. In other instances, the route may be manually selected (e.g., by the operator and/or a supervisor) from among a plurality of available routes. Display of the route may include, among other things, a listing of the target locations, directions to the target locations, a map of the target locations, service information about each target location (e.g., an expected number and/or size of receptacles 14 at each target location), and/or a schedule of when each target location should be serviced.

After receiving the route (e.g., as electronic data stored inside input device 40), the operator may drive service vehicle 12 toward a target location listed first in the route. During this travel, onboard controller 30 may track the location of service vehicle 12 (Step 320), and compare the location to a known position of the target location. Specifically, onboard controller 30 may determine if service vehicle 12 is within a threshold proximity of the target location (Step 330). Onboard controller 30 could make this determination in several different ways, depending on the particular configuration of locating device 38. For example, based on a comparison of a GPS location of service vehicle 12 with known coordinates of the target location, onboard controller 30 may determine that service vehicle 12 is close enough to the target location for management personnel 15 to perform the required service (e.g., with about 10 meters of the target location). In another example, based on the detection (e.g., a strength and/or identification) of a Wi-Fi or other wireless signal broadcast from transmitter 42 at the target location, onboard controller 30 may be able to determine that service vehicle 12 is adequately close to the target location. In yet another example, onboard controller 30 may rely on both the GPS location and the Wi-Fi signal as input to the determination made at step 330. When onboard controller 30 determines that service vehicle 12 is not within the threshold proximity to the target location (Step 330:N), control may loop back to step 320.

However, when onboard controller 30 determines that service vehicle 12 is close enough to the target location for management personnel to perform the required service at the target location (Step 330:Y), onboard controller 30 may begin monitoring input from wearable 18 and determine if management personnel 15 is actually performing the required service (Step 340). In some embodiments, the tracked activity may need to be greater than a threshold activity level in order for onboard controller 30 to determine that the required service is being performed. In other embodiments, the tracked activity may also or alternatively need to match an expected pattern of activities corresponding to performance of the service. It is contemplated that other strategies of using the tracked activity of management personnel 15 to determine the performance of a waste service could also be employed. Onboard controller 30 may selectively flag the target location as having been serviced (Step 350) or having not been serviced (Step 360) based on the determination made at step 340. By waiting to monitor the activity of management personnel 15 until service vehicle 12 is sufficiently close to the target location, other non-service related activities of management personnel 15 may not significantly affect an accuracy of system 36.

After generating the appropriate flag for the target location (i.e., after completing step 350 or step 350), onboard controller 30 may determine if the route assigned to service vehicle 12 has been completed (Step 370). In particular, when the target location just flagged was the last target location in the assigned route, the route may be considered complete and control may return to step 300. However, when the target location just flagged was not the last target location in the assigned route, the route may be considered incomplete and control may return to step 320.

FIG. 4 shows exemplary GUIs 400 and 450, which may be used to facilitate the process that is described above and shown in FIG. 3. GUIs 400 and 450 may be shown on any onboard input device 40 (referring to FIG. 2) and, as can be seen in FIGS. 3 and 4, may correspond with steps 300-340 in the flowchart of FIG. 3.

For example, after login of the vehicle operator to the disclosed app, GUI 400 may be displayed on input device 40 showing an assigned route number, the entered vehicle identification number, the entered operator identification number, a map of the assigned route, a current location of service vehicle 12, and a list of target locations that require the services of service vehicle 12. GUI 400 may also illustrate which of the target locations have been serviced, which (if any) are unserviceable, and which have not yet been visited by service vehicle 12. In some embodiments, parameters associated with the servicing of the target locations may be calculated and displayed within GUI 400. These parameters may include, among other things, a measure of how much of the assigned route and/or service area has been completed (e.g., how many target locations have been serviced, how many target locations remain, a percent of completion, etc.) and how much of the assigned route and/or service area is unserviceable (e.g., how many target locations were passed by without being serviced, a percent of unserviceable target locations, etc.).

When onboard controller 30 of service vehicle 12 generates a flag indicating that the target location was "Not Serviced", GUI 450 may be responsively displayed on input device 40. GUI 450 may provide a way for the operator of service vehicle 12 to explain why the target location was not serviced. For example, the operator may be able to activate a first button indicating that no receptacle 14 was placed out for servicing. In another example, the operator may be able to activate a second button indicating that another reason exists for the lack of performed service. In some embodiments, after activating the second button, the operator may be able to input notes regarding the other reason.

The interfaces illustrated in FIG. 4 are exemplary only and are provided to highlight certain aspects of the disclosed system. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing waste services, comprising:
a wearable device configured to generate a first signal indicative of motion of management personnel;
a locating device configured to generate a second signal indicative of a location of a service vehicle;
an electronic transmitter-receiver on-board the service vehicle configured to receive local wireless signals corresponding to a target location and generate a third signal identifying a unique transmitter and a strength of a local wireless signal from the target location to the service vehicle; and
a controller on-board the service vehicle in communication with the locating device and the wearable device, the controller being configured to:
determine based on the second signal a proximity of the service vehicle to the target location at which one or more waste services are to be performed;
automatically monitor an activity of the management personnel to be tracked via the wearable device attached to the management personnel, the wearable device including a motion sensor and a transmitter configured to wirelessly broadcast signals, in response to the proximity of the service vehicle being within a threshold proximity of the target location;
receive the first signal indicative of motion of the management personnel from the wearable device by the management personnel;
correlate the first signal indicative of motion of the management personnel to service activity patterns;
determine based on the correlation of the first signal to the service activity patterns, completion of a first service activity; and
automatically flag the target location in a memory as having been serviced based on the completion of the first service activity at the target location based on activity of the wearable device exceeding a threshold.

2. The system of claim 1, wherein:
the electronic transmitter-receiver is a Wi-Fi receiver; and
the controller is configured to determine the proximity of the service vehicle to the target location based on a Wi-Fi signal broadcast from the target location and received by the Wi-Fi receiver.

3. The system of claim 2, wherein the controller is configured to determine the proximity of the service vehicle to the target location based on a strength of the Wi-Fi signal and identification of a Wi-Fi transmitter at the target location that is broadcasting the Wi-Fi signal.

4. The system of claim 1, wherein:
the locating device is a GPS receiver; and
the controller is configured to determine the proximity of the service vehicle to the target location based on a GPS signal received by the GPS receiver and based on known coordinates of the target location.

5. The system of claim 1, wherein the wearable device includes at least one of an accelerometer and a gyroscope.

6. The system of claim 1, wherein the controller is configured to automatically flag the target location in memory as having been serviced when the motion of the management personnel that is tracked matches an expected activity pattern.

7. The system of claim 1, further including an input device, wherein the controller is further configured to provide a graphical user interface for display on the input device, the graphical user interface selectively showing the target location as being serviced based on the flagging.

8. The system of claim 1, wherein the controller is further configured to generate billing for the waste services performed at the target location based on the flagging.

9. A method for managing waste services, comprising:
receiving a first signal indicative of motion of management personnel;
generating a second signal indicative of a location of a service vehicle;
determining based on the second signal a proximity of the service vehicle to a target location at which one or more waste services are to be performed;
receiving via an electronic transmitter-receiver on-board the service vehicle local wireless signals corresponding to the target location;
generating a third signal identifying a unique transmitter and a strength of a local wireless signal from the target location to the service vehicle;
automatically monitoring an activity of management personnel to be tracked via a wearable device by the management personnel in response to the proximity of the service vehicle being within a threshold proximity of the target location;
correlating the first signal indicative of motion of the management personnel to service activity patterns;
determining based on the correlation of the first signal to the service activity patterns, completion of a first service activity; and
automatically flagging the target location as having been serviced based on activity of the wearable device exceeding a threshold.

10. The method of claim 9, wherein determining the proximity of the service vehicle to the target location includes determining the proximity of the service vehicle to the target location based on a strength and an identification of a Wi-Fi signal broadcast from the target location.

11. The method of claim 9, wherein determining the proximity of the service vehicle to the target location includes determining the proximity of the service vehicle to the target location based on a received GPS signal associated with the service vehicle and based on known coordinates of the target location.

12. The method of claim 9, wherein automatically flagging occurs when the motion of the management personnel that is tracked matches an expected activity pattern.

13. The method of claim 9, further including selectively displaying the target location on a display inside the service vehicle as being serviced based on the flagging.

14. The method of claim 9, further including generating billing for the waste services being performed at the target location based on the flagging of the first service activity.

15. A non-transitory computer readable medium containing computer-executable programming instructions for performing a method of waste service management, the method comprising:
receiving a first signal indicative of motion of the management personnel from a wearable device by the management personnel;
generating a second signal indicative of a location of a service vehicle;
determining based on a strength of local wireless signals broadcast from the target location, a proximity of a service vehicle to a target location at which one or more waste services are to be performed;
generating a third signal identifying a unique transmitter and a strength of the local wireless signals broadcast from the target location to the service vehicle;
automatically monitoring activity of the management personnel to be tracked via the wearable device by the management personnel in response to the strength of the local wireless signals broadcast being above a threshold strength;
correlating the first signal indicative of motion of the management personnel to service activity patterns;
determining based on the correlation of the first signal to the service activity patterns, completion of a service activity; and
automatically flagging the target location as having been serviced based on activity of the wearable device exceeding a threshold.

16. The non-transitory computer readable medium of claim 15, wherein automatically flagging occurs when the motion of the management personnel matches an expected activity pattern.

17. The system of claim 1, wherein the motion of the management personnel includes one or more of lifting, tilting, dumping, and shaking.

18. The method of claim 9, wherein the motion of the management personnel includes one or more of lifting, tilting, dumping, and shaking.

* * * * *